(12) United States Patent
Pater

(10) Patent No.: US 6,588,608 B2
(45) Date of Patent: Jul. 8, 2003

(54) STORAGE SYSTEM WITH AUTOMATIC ELEVATOR

(75) Inventor: John F. Pater, Northbrook, IL (US)

(73) Assignee: Konstant Products, Inc., Skokie, IL (US)

( * ) Notice: Subject to any disclaimer, the term of this patent is extended or adjusted under 35 U.S.C. 154(b) by 0 days.

(21) Appl. No.: 09/872,954

(22) Filed: Jun. 1, 2001

(65) Prior Publication Data

US 2002/0179555 A1 Dec. 5, 2002

(51) Int. Cl.⁷ .................................................. A47F 5/00
(52) U.S. Cl. ....................... 211/151; 211/59.2; 414/276; 414/286
(58) Field of Search ............................... 211/151, 1.51, 211/1.57, 207, 187; 414/286, 276

(56) References Cited

U.S. PATENT DOCUMENTS

| 3,392,813 A | * | 7/1968 | Trautmann |
| 3,805,924 A | * | 4/1974 | Andersson et al. |
| 4,068,751 A | * | 1/1978 | Azzi |
| 4,485,910 A | * | 12/1984 | Tabler .................... 414/286 X |
| 5,170,896 A | * | 12/1992 | Konstant .................... 211/151 |
| 5,476,180 A | * | 12/1995 | Konstant .................... 211/151 |
| 5,513,936 A | * | 5/1996 | Dean .................... 414/276 X |
| 5,567,103 A | * | 10/1996 | Konstant .................... 414/276 |
| 5,617,961 A | * | 4/1997 | Konstant et al. ............ 211/151 |
| 5,642,976 A | * | 7/1997 | Konstant .................... 414/276 |
| 5,735,661 A | * | 4/1998 | De Frondeville et al. ... 414/276 |
| 5,873,473 A | * | 2/1999 | Pater .................... 211/151 X |
| 6,186,725 B1 | * | 2/2001 | Konstant .................... 414/276 |
| 6,468,015 B1 | * | 10/2002 | Konstant .................... 414/276 |

* cited by examiner

*Primary Examiner*—Robert W. Gibson, Jr.
(74) *Attorney, Agent, or Firm*—Niro, Scavone, Haller & Niro

(57) ABSTRACT

The present invention is generally directed to an elevator for multi-level rack storage systems that can automatically and continuously transfer loads from an upper level to a lower level without the use of an external power source.

6 Claims, 7 Drawing Sheets

3 LEVELS (2 ELEVATORS)

STORAGE SYSTEM WITH AUTOMATIC ELEVATOR

BACKGROUND OF THE INVENTION

The present invention relates generally to multi-level storage systems and, more particularly, to multi-level storage systems having an automatic elevator for the efficient storage and delivery of goods. The present invention is particularly advantageous when used in warehouse applications where a single storage bay is used for a single product, such as in the grocery sector where first-in-first-out storage is desirable.

An important consideration in the storage or warehouse industry, including the grocery sector, is the ability to safely and efficiently load and unload stored products while maintaining a high storage density for a given storage area. Another important consideration in the grocery sector, among others, is the ability to efficiently store and retrieve loads on a first-in-first-out basis. Various systems capable of accommodating these considerations are shown and described in U.S. Pat. Nos. 5,476,180, 5,617,961, 5,642,976 and 6,186,725.

SUMMARY OF THE INVENTION

The present invention preserves the advantages of the various known first-in-first-out storage systems and also provides new features and advantages. For example, the present invention provides a load storage and unloading system that can automatically deliver loads from an upper storage level to a lower level for unloading. The system of the present invention is capable of the continuous and automatic transfer of loads from the upper level to the lower level, without the use of an external power source or other complicated arrangements.

In a preferred embodiment of the present invention, a load storage system is provided having a two-tiered flow rail conveyor system. The system includes an upper set of input flow rails which are inclined toward the rear of the system and which form an input conveyor, and a lower set of output flow rails which are inclined toward the front of the system and which form an output conveyor. The input and output flow rails provide the surfaces upon which loads may roll. At the rear end of the system is an elevator assembly, the deck of which also provides a surface upon which loads may roll. Upon receipt of a load from the input conveyor, the elevator automatically and smoothly lowers the load to the output conveyor for unloading. An elevator lock and release mechanism retains the elevator in its lowered position until the load to be transferred clears the elevator assembly as it rolls along the output conveyor. Once the transferred load clears the elevator assembly as it rolls along the output conveyor, the elevator automatically returns to the input conveyor for receipt of another load. Since the system typically contemplates the storage of multiple deep loads, e.g., two or more on the input and/or output conveyors, an automatic load stop is provided on the input conveyor to prevent a load from rolling onto the elevator assembly when it is not in a fully raised position and ready to receive a load. In addition, a reverse flow mechanism is provided so that the elevator deck assembly is at the proper angle to receive a load as well as being at the proper reverse angle to transfer a load. Rolling brakes or other means may also be provided along the input conveyor to maintain the proper spacing along the input flow rails between a load entering the elevator and a subsequent load.

Accordingly, an object of the present invention is to provide a multi-level storage system having an elevator that efficiently stores and delivers loads on a first-in-first-out basis.

Another object of the present invention is to provide a multi-level storage system that includes an elevator to automatically deliver a load from the upper level of the system to the lower level of the system.

Yet another object of the present invention is to provide a multi-level storage system with an elevator that provides high storage density for a given storage area.

A further object of the present invention is to provide a storage system that automatically delivers a load to the lower level of the system using an elevator which is self-contained and does not rely upon external power sources.

Still another object of the present invention is to provide an elevator for use in transferring loads in a variety of multi-level storage applications.

An additional object of the present invention is to provide a multi-level storage system that operates on a first-in-first-out basis.

Still a further object of the present invention is to provide an elevator with a reverse flow mechanism so that the elevator deck assembly is at the proper angle to receive and then transfer a load.

INVENTOR'S DEFINITION OF THE TERMS

The terms used in the claims of this patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The stated and unstated features and advantages of the present invention will become apparent from the following descriptions and drawings wherein like reference numerals represent like elements in the various views, and in which.

DETAILED DESCRIPTION OF PREFERRED EMBODIMENTS

Set forth below is a description of what is currently believed to be the preferred embodiment or best representative example of the inventions claimed. Future and present alternatives and modifications to the preferred embodiment are contemplated. Any alternatives or modifications which make insubstantial changes in function, purpose, structure or result are intended to be covered by the claims of this patent.

Figure 1:
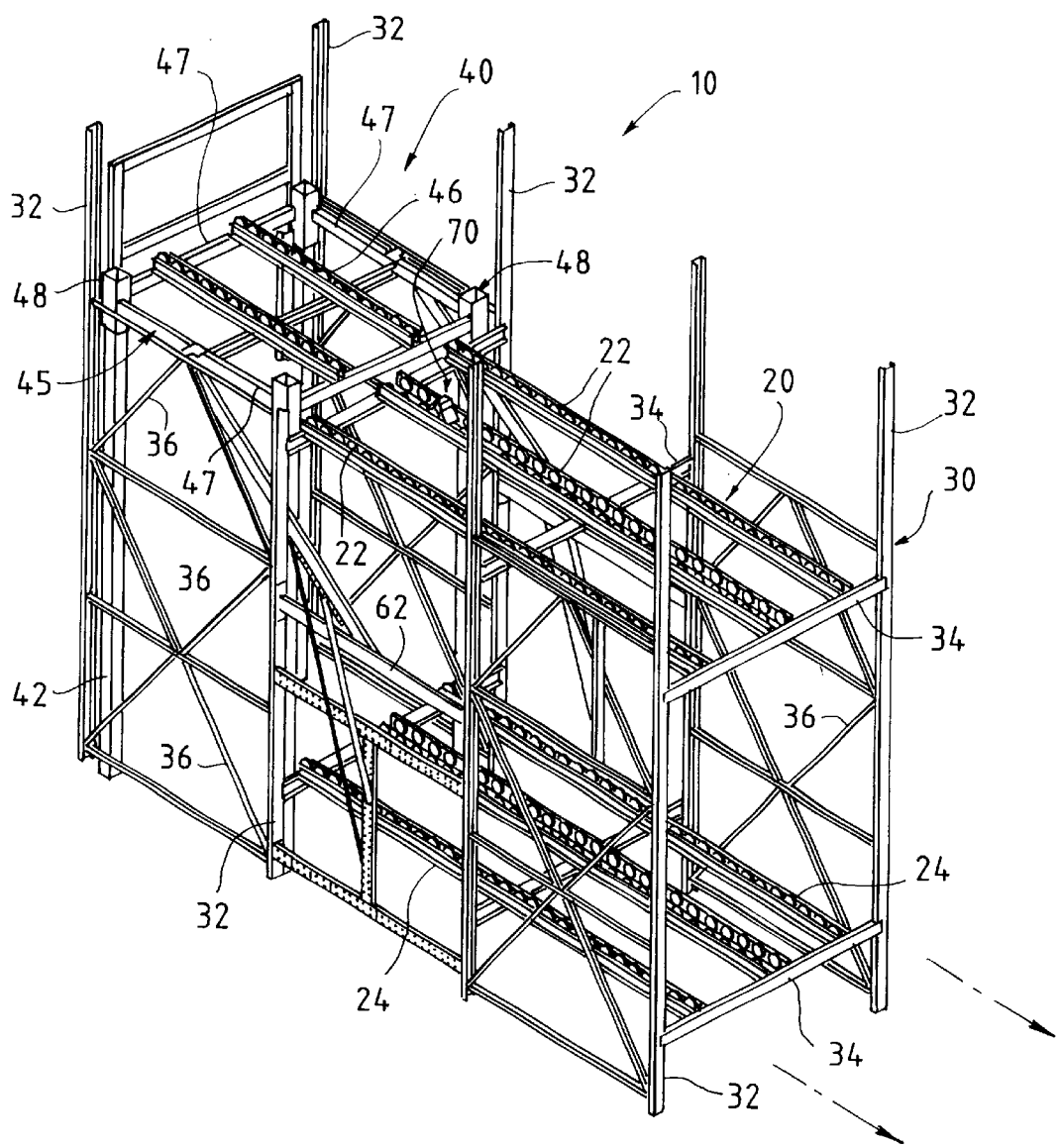
FIG. 1 is a side perspective view of an embodiment of the present invention shown with the elevator in the up position and with portions removed for clarity.
Figure 1A:
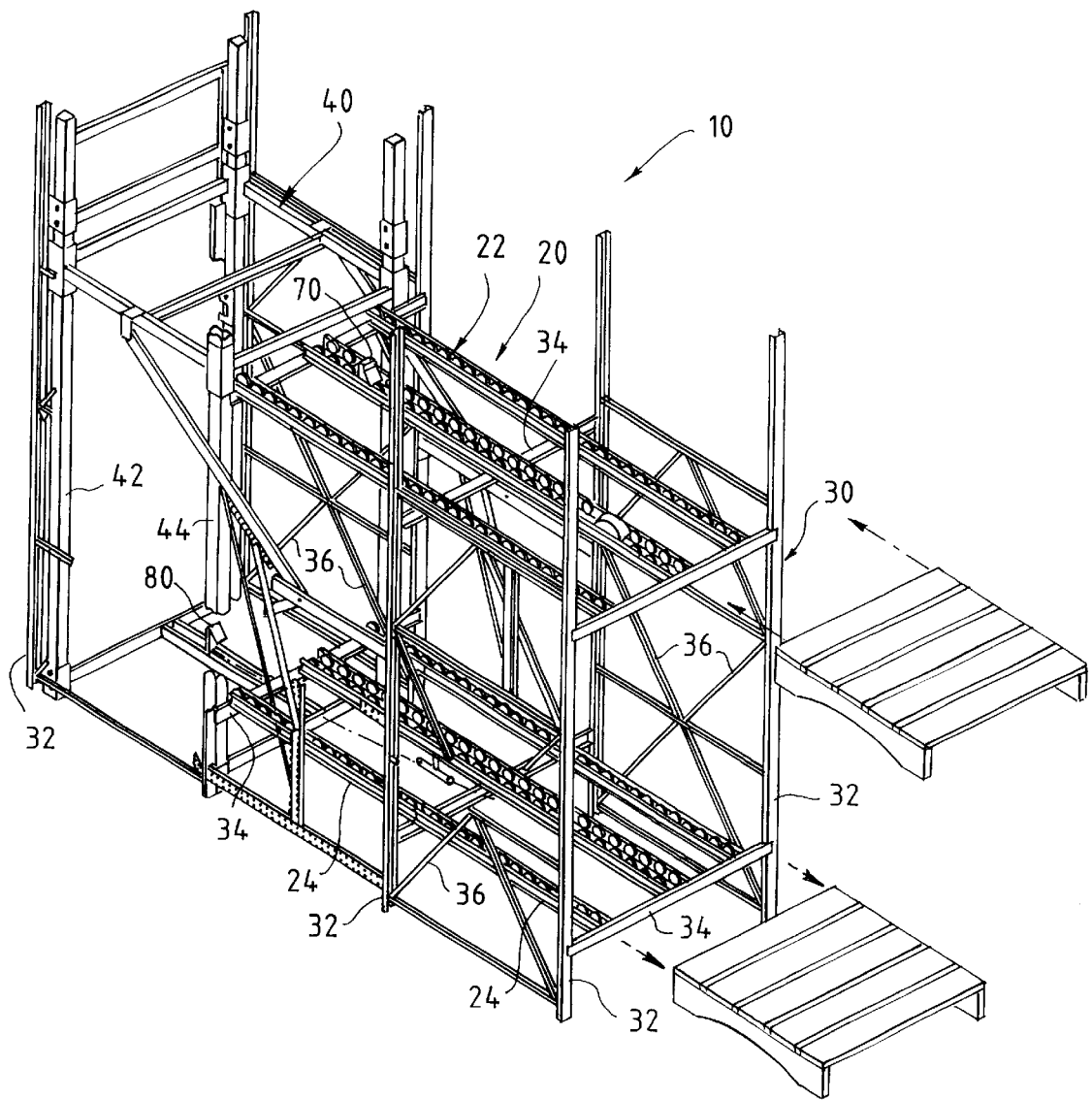
FIG. 1A is a side perspective view of an embodiment of the present invention with the elevator in the up position and with portions removed for clarity.
Figure 2:
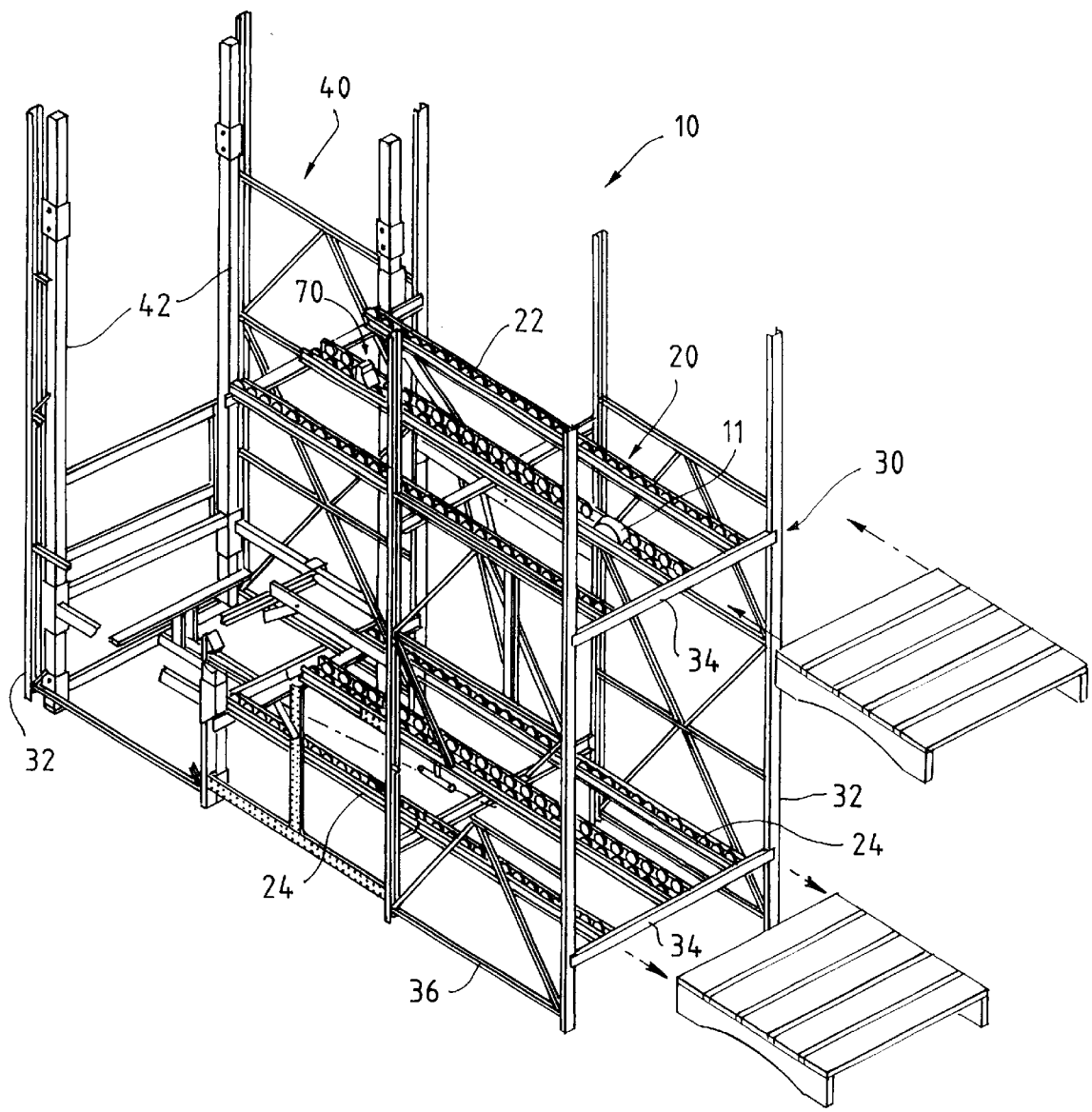
FIG. 2 is a side perspective view of an embodiment of the present invention shown with the elevator in a lowered position and with portions removed for clarity.

A multi-level storage system having an automatic elevator in accordance with the present invention is shown generally as 10 in the Figures. By reference to FIGS. 1, 1A and 2, a multi-level storage system 10 includes a two-level flow rail conveyor system 20, a support structure 30, and an elevator assembly 40. As used herein, the term "load" is used in its broadest possible sense to include pallets, containers or parts bins, slip sheets, carts, unit loads and the like.

Figure 10:
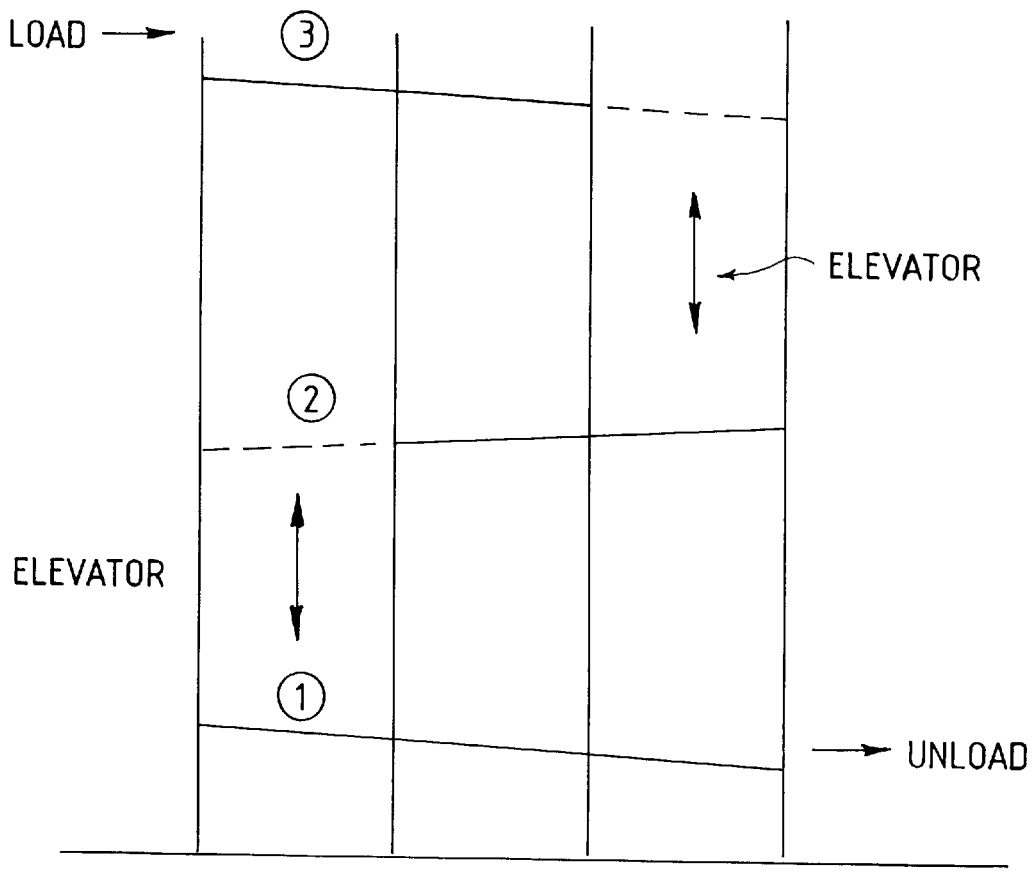
FIG. 10 is a schematic view of three systems of the present invention stacked on top of one another.

The support structure 30 is designed to support the flow rail conveyor system 20, as well as the loads to be stored. The configuration of a preferred support structure 30 includes a number of parallel columns 32, beams 34 interconnecting the columns 32 and support braces 36. It will be understood by those of ordinary skill in the art that any number of support structures 30 may be placed in side-by-side relationship or stacked on top of one another as the particular application and available space dictate. For example, if an even number of levels is used, loading and unloading take place from the same aisle. If an odd number of levels is used, loading and unloading take place in separate aisles, as shown in FIG. 10.

Moreover, depending upon the design load, any necessary support may be provided by additional or larger columns 32, beams 34, braces 36 and the like, which may be connected in a variety of ways, such as bolts, welding and the like. In addition, channel structural members are shown and used for many of the components in the preferred embodiment of the support structure 30 and other assemblies. It will be understood, however, that a wide variety of cross-sectional shapes, including rectangular, square, round tube and hot-rolled I and S beam cross-sections, may also be used for the support structure and other components and assemblies of the present invention.

In a preferred embodiment of the present invention, flow rail conveyor system 20 includes a plurality of input flow rails 22 which are inclined downward toward the rear of the system 10 to permit the load to be loaded on the system and roll smoothly toward the rear of the system. A plurality of output flow rails 24 are also provided. Output flow rails 24 are inclined downward to the front of the system so that loads, after transfer from the elevator assembly 40, roll smoothly down output flow rails 24 and can be unloaded from the system 10.

Flow rail conveyor system 20 consists of three spaced parallel input flow rails 22 and three spaced parallel output flow rails 24. As will be understood by those of ordinary skill in the art, the input flow rails 22 and output flow rails 24 may be formed from a series of in-line rollers that define rolling surfaces which permit a load to roll along their length. However, depending upon the type of loads to be stored and the design loads of the system, a single flow conveyor assembly, two parallel rows of flow rail conveyor assemblies or other types of flow assemblies may be used.

Figure 5:
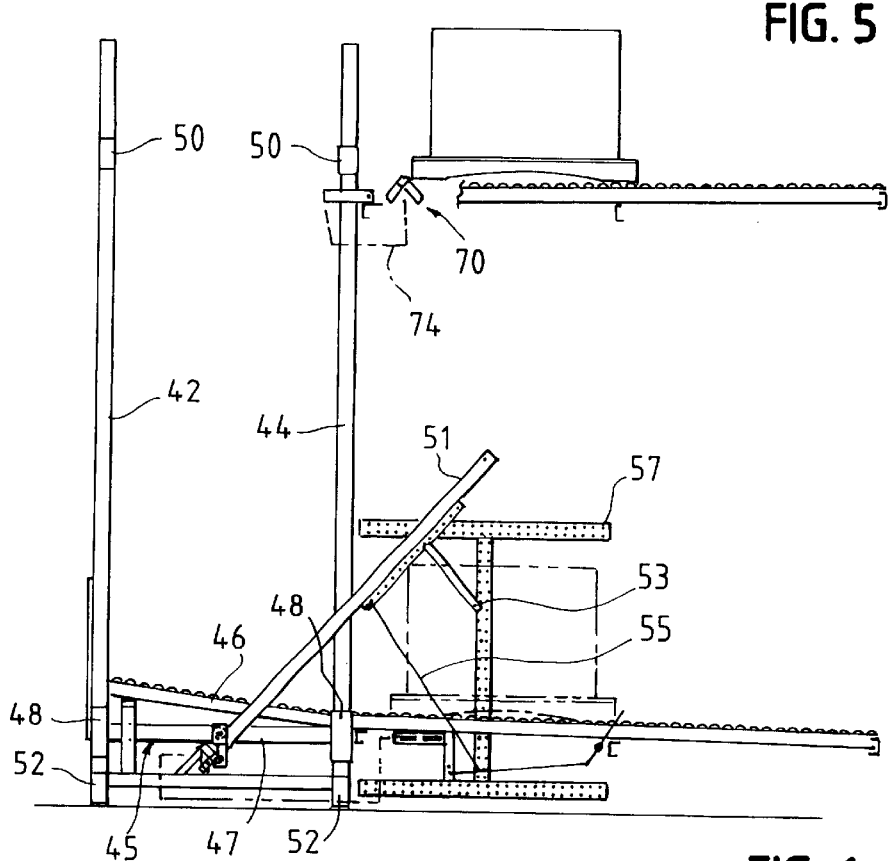
FIG. 5 is a side elevational view of an embodiment of the present invention of FIG. 3 shown with the elevator in a lowered position.
Figure 6:
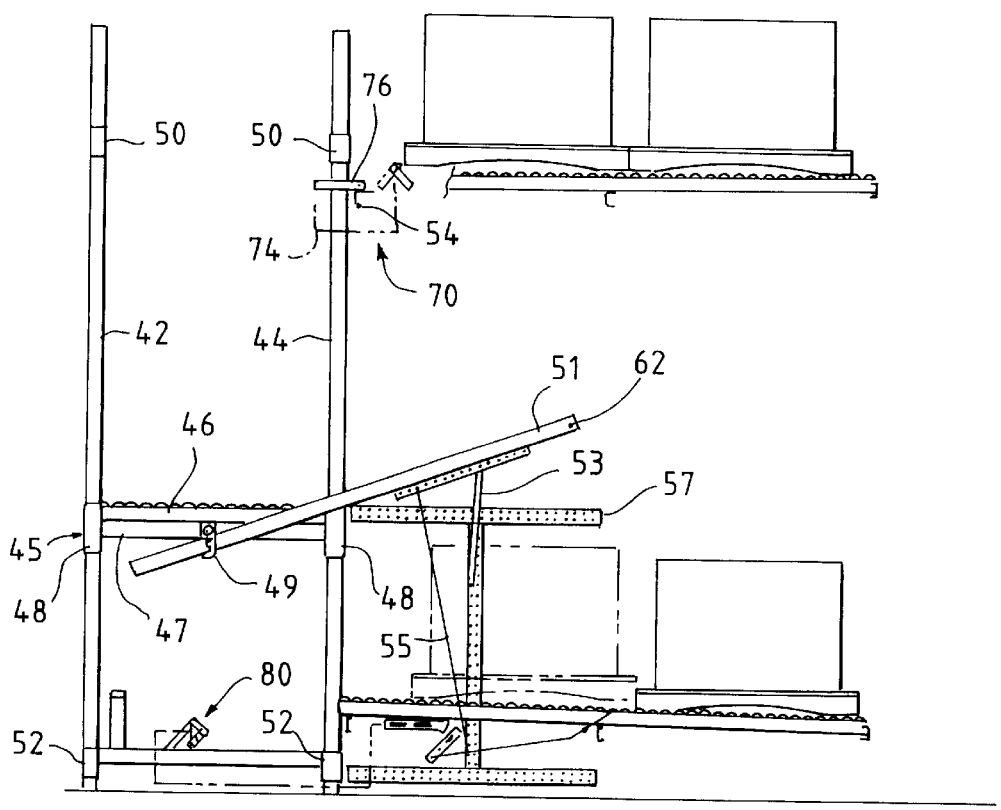
FIG. 6 is a side elevational view of an embodiment of the present invention of FIG. 3 shown with the elevator in an intermediate position and returning to the raised position.
Figure 7:
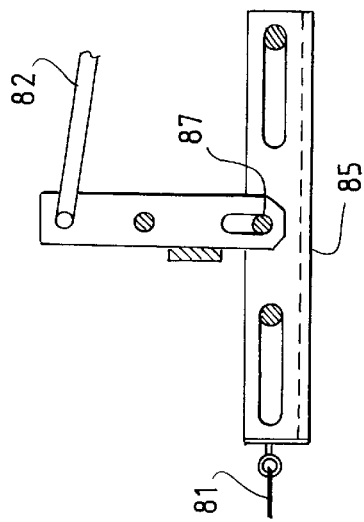
FIG. 7 is a side elevational view of components of an embodiment of the load stop mechanism and portions of the elevator deck assembly of the present invention.
Figure 8A:
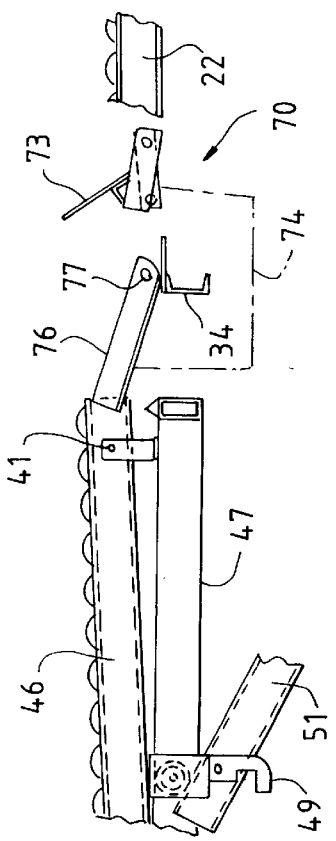
FIG. 8A is a side elevational view of an alternative embodiment of an elevator lock and release mechanism of the present invention.
Figure 8:
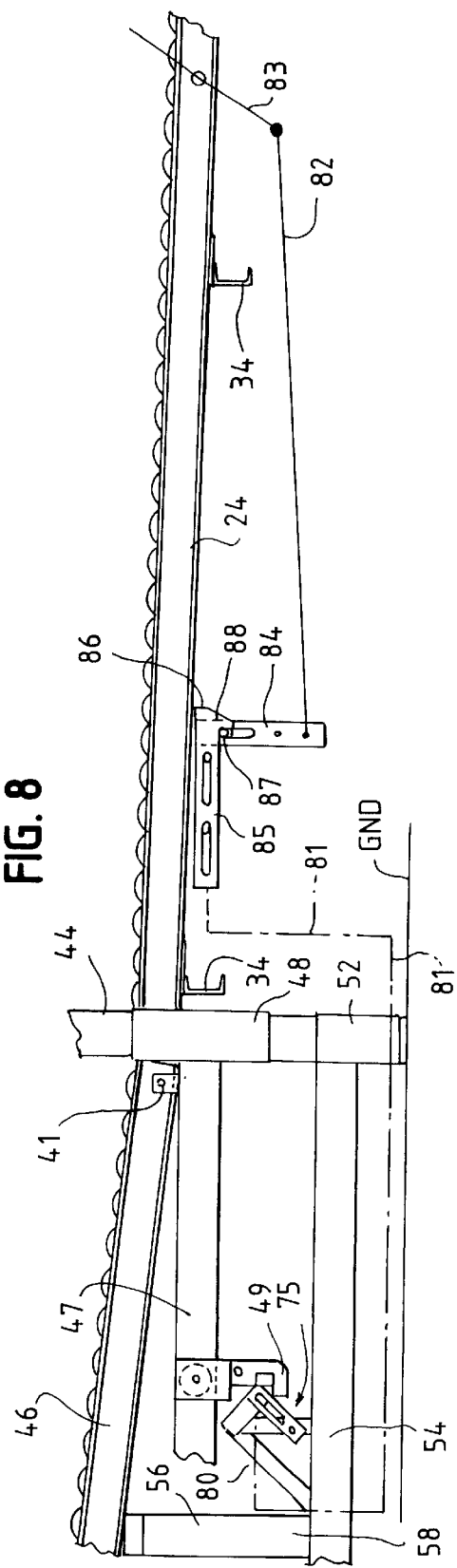
FIG. 8 is a side elevational view of the elevator lock and release assembly and portions of the elevator deck assembly of the present invention.

The structure and operation of the elevator assembly 40 (and the other assemblies that cooperate with it) is shown by reference to FIGS. 3 through 9. In a preferred embodiment of the present invention, the elevator assembly 40 includes a pair of parallel spaced rear elevator columns 42 and a pair of spaced parallel front elevator columns 44. The elevator columns 42 and 44 are designed to fit within support structure 30, (see FIG. 1) leaving sufficient space for the operation of the elevator as hereinafter described. An elevator deck assembly 45 is provided which includes a pair of elevator flow rails 46 which are supported by and pinned at one end to elevator deck frame members 47. Elevator flow rails 46 provide the rolling surface for the loads entering and exiting the elevator deck assembly 45. As best shown in FIGS. 7 and 8, elevator flow rails 46 are pinned 41 at their forward end to deck frame members 47 by well known means. The height of pin 41 is designed so that the slope of the elevator flow rails 46 is consistent with the slope of the input flow rails 22. In this manner, a load may flow smoothly down input flow rails 22 and onto the elevator flow rails 46.

In a preferred embodiment of the present invention, elevator deck assembly 45 is generally rectangular and includes four tubular sleeve members 48 in each corner of the deck assembly 45. As shown, the tubular sleeve members 48 are interconnected by elevator deck frame members 47. Sleeve members 48 are designed to slide up and down along elevator columns 42 and 44 and guide elevator deck assembly 45 as it ascends and descends to transfer loads as hereinafter described. A hook 49 is pivotably attached to one of the deck frame members 47 and hangs vertically below elevator deck assembly 45 (see FIG. 8). A torsion spring (not shown) keeps the hook in the vertical position and enables the hook to deflect slightly when deck assembly 45 is locked in its lowered position as hereinafter described.

It will be understood by those of ordinary skill in the art that the generally rectangular elevator deck assembly 45 may take a variety of configurations and be made from a variety of structural members, depending upon the particular application and design loads. Similarly, although the preferred embodiment utilizes separate elevator support columns 42 and 44 and tubular sleeves 48 that slidably engage the elevator support columns 42 and 44, various other embodiments may be readily utilized. For example, components of the support structure system 30 may be used to guide and/or support elevator deck assembly 45 as required. In addition, instead of the guide sleeve members 48, other types of brackets, bearings or other means may be used to restrict the lateral movement of the elevator deck assembly 45 while permitting it to smoothly ascend and descend as contemplated by the present invention.

Figure 3:
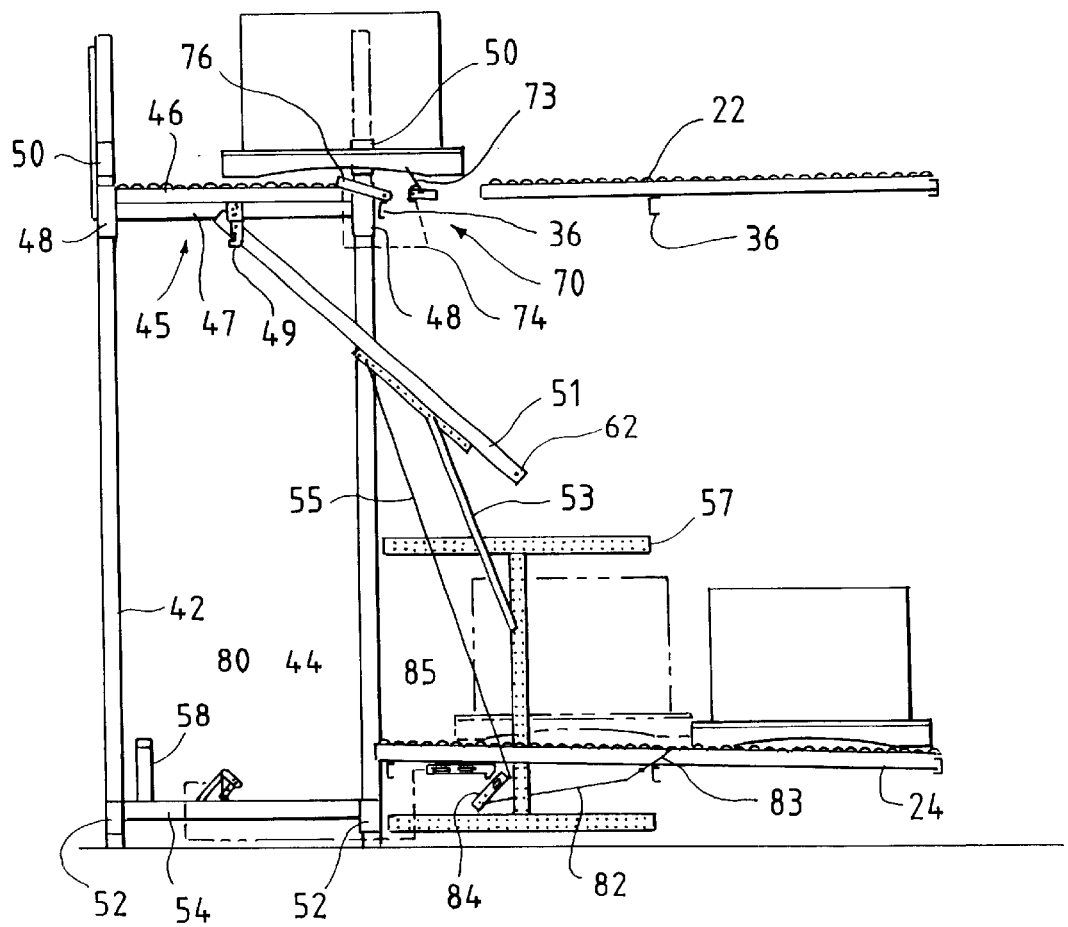
FIG. 3 is a side elevational view of an embodiment of the present invention with the elevator in a raised position and with portions removed to show the components and operation of the elevator assembly, load stop assembly, elevator lock and release assembly and reverse flow mechanism.
Figure 4:
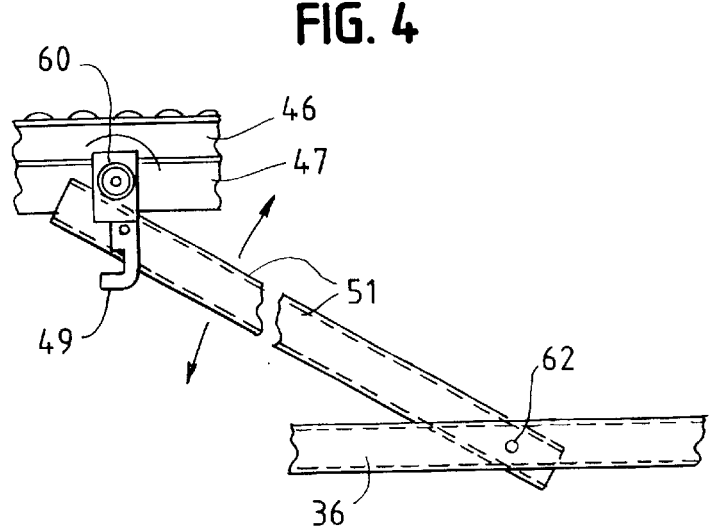
FIG. 4 is a side elevational view of components of an embodiment of the elevator guide arms of the present invention.

In a preferred embodiment of the present invention, the elevator deck assembly 45 is supported by and rendered operable though a series of components, which include a pair of elevator guide arms 51, a pair of dampers 53 and a pair of gas springs 55 (all shown schematically in FIGS. 3, 5 and 6). An opposing pair of damper brackets 57 are also provided that are used to support and/or pivotably mount various components of the elevator assembly 40 as hereinafter described. Alternatively, portions of the support structure 30 may be used to support and mount some or all of the components of elevator assembly 40.

Figure 9:
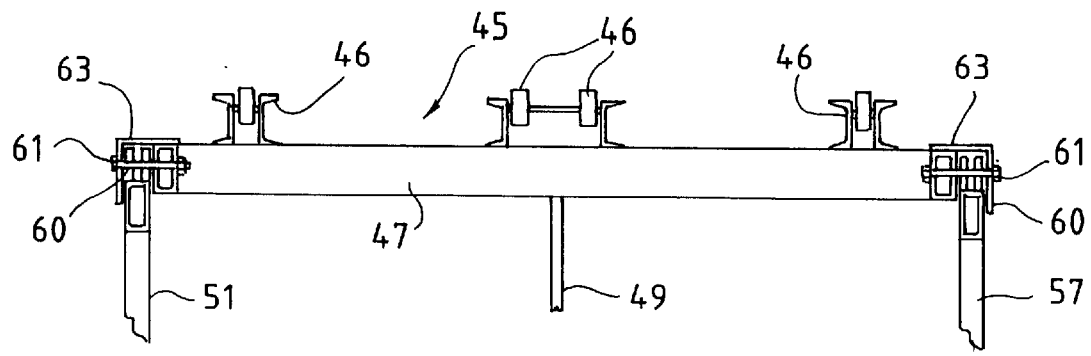
FIG. 9 is a cross-sectional view through an embodiment of the elevator deck assembly of the present invention.

In a preferred embodiment, roller bearings 60 are attached to both sides of elevator deck assembly 45 to side deck frame members 47 through bolts 61 or other well known means (see FIG. 9). Roller bearings 60 enable elevator deck assembly 45 to ride along the top surface of elevator guide arms 51 as elevator deck assembly 45 operates through its range of motion. Support angles 63 may also be provided to help protect roller bearings 60. The front end 62 of elevator guide arms 51 is pivotably mounted by well known means to a brace 36 or other suitable components of support structure 30 member. One end of damper 53 is pivotably mounted to elevator guide arm 51 and the other end pivotably mounted to damper brackets 57. Similarly, gas spring 55 is pivotably mounted at one end to elevator guide arm 51 and at the other end to damper bracket 57. The gas spring 55, damper 53 and guide arm 51 enable the elevator deck assembly 45 to smoothly lower and transfer and load, and smoothly and automatically return the elevator deck assembly 45 to its upper position to secure the next load.

For example, when a load rolls on to the elevator deck assembly 45, the weight of the load overcomes the force from the gas springs 55 and the load and elevator deck assembly 45 begin to descend. As elevator deck assembly 45 descends along elevator columns 42 and 44, the bearings 60 ride along the top of elevator guide arms 51 (compare FIGS. 3, 5 and 6) as elevator guide arms 51 rotate downward about their pivot points. The rate of descent of elevator deck assembly 45 and the load is smoothed and regulated by dampers 53, which also carry some of the excess loads on gas springs 55. When the elevator deck assembly 45 reaches its lowered position and elevator deck rollers 46 are adjacent to the output flow rails 24, the elevator deck assembly 45 is locked in the lowered position by an elevator lock and release assembly 80 (and the hook 49) and the load then rolls off of the elevator deck assembly 45. Once the load sufficiently clears the elevator deck assembly 45, the elevator lock and release assembly 80 unlocks the elevator deck assembly as hereinafter described. The force of the gas springs 55 are then greater than the weight of the unloaded elevator deck assembly 45, and the elevator deck assembly 45 is raised to its upper position to receive another load by the gas springs 55.

It will be understood by those of ordinary skill in the art that in designing the system, it is important to select and adjust the gas springs 55 by consideration of the weight of the deck assembly 45 and the weight of the loads contemplated. For example, the vertical weight of deck assembly 45 and a pallet and load should be slightly greater than the vertical force exerted by gas springs 55 on deck assembly 45 through guide arms 51 so that the load and elevator deck assembly 45 may descend. In the preferred embodiment of the present invention, the preferred adjustable gas springs 55 are presently available from Hahn Gas Springs of Aichschieb, Germany (i.e., its gas spring model no. G 2040 1000 2200 WG45 WG45). Although other types and makes of gas springs may be used in the present invention, these gas springs are believed to provide the best operation and adjustability. Other acceptable gas springs are available from Suspa, Inc. of Grand Rapids, Mich. and Stabilis of Colmar, Pa. Similarly, oil dampers 53 are also presently available from Hahn Gas Springs (model no. D 1440 7502 1630 WG35 WG35). Other suitable dampers that can provide controlled action as contemplated herein which can handle the design load and control the descent of the load may also be used.

The range of motion of the elevator deck assembly is controlled by the strategic placement of upper elevator stops 50 and lower elevator stops 52. When the elevator deck assembly 45 is in the upper position, it is forced against upper elevator stop 50 by the gas springs 55. When the elevator deck assembly 45 is in the lowered position with a load, the elevator deck assembly 45 is forced against lower stops 52 by the weight of the load. The elevator stops 50 and 52 may take a form similar to tubular sleeve members 48, although other means may be readily employed. Elevator stops 50 and 52 may be bolted, welded or the like onto the desired position on front elevator columns 44 and rear elevator columns 42.

The flow of loads along input flow rails 22 to elevator deck assembly 45 is controlled by a load stop assembly 70 (see FIG. 7). The structure and operation of preferred load stop assembly 70 is shown and described in U.S. Pat. No. 5,873,473, which is incorporated herein by reference. The load stop assembly 70 is mounted to the input flow rails 22 at a desired position along their length. A stop plate 73 is provided which is designed to engage and stop the load (see e.g., FIG. 6) when in the stop position.

In a preferred embodiment of the present invention, load stop 70 is automatically operated in conjunction with the elevator deck assembly 45. Specifically, a lever 76 is provided which is pivotably mounted 77 to a beam 34 or other member of support system 20. Lever 76 is designed to be engaged by elevator deck assembly 45 when the assembly is in its upper position. When lever 76 is so engaged, it pulls a cable 74 (a rod, bar or other linkage may also be used) which forces load stop 70 to assume a release position and permit a load to roll onto elevator deck assembly 45. When that occurs, elevator deck assembly 45 begins the descend and disengages lever 76, which in turn, through cable 74, activates load stop 70 into a stop position, prohibiting another load from passing, except when the elevator deck assembly 45 is in its top position to properly receive a load.

In addition, retarders or brakes 11 (see FIGS. 1A and 2) may be incorporated along the input flow rails 22 in order to slow the flow of and separate any loads in the system, especially when multiple depth systems are used. Their type and incorporation will be understood by those of ordinary skill in the art. In general, however, such retarders may take the form of a large rubber roller having a centrifugal brake assembly, the surface of which contacts the bottom of a roller which is in contact with the lower surface of the load. In this manner, among others, the flow of containers may be slowed and desired spacing maintained between loads, particularly as one load is entering elevator assembly 40.

An elevator lock and release assembly 80 is also provided (see FIG. 8) which is designed to hold the elevator deck assembly 45 in its lowered position so that a load may smoothly transfer from elevator deck assembly 45 onto the output flow rails 24. The principal components of lock and release mechanism 80 are also shown and described in the Pater '473 patent and are simply oriented in a vertical manner to engage hook 49, which extends from frame member 47 of deck assembly 45. When elevator deck assembly 45 reaches its lowered position, a latch 75 engages hook 49 and keeps the elevator deck assembly 45 in the lowered position while a load is being transferred to the output flow rails 24. Once the load is transferred to and rolls along the output flow rails 24, the load depresses lever 83, which is placed a sufficient distance along output flow rails 24. Lever 83 pushes a common link 84 through rod 82. The common link 84 rotates about its center. A spring loaded pin 87 in the top of the common link 84 pulls a horizontally fixed link 85 which is attached to a cable 81. Cable 81 pulls the vertically oriented elevator lock and release assembly 80 which temporarily collapses and releases hook 49, and the elevator deck assembly 45 then raises to assume a position to receive another load. Pin 87 eventually rotates away and separates from catch 88 of link 85. As soon as pin 87 and catch 88 separate, the torsion spring from the elevator lock and release assembly 80 retracts horizontal link 85 to its initial position. Once the load that has just activated the elevator lock and release assembly 80 moves past and clears lever 83, a torsion spring (not shown) sets lever 83 back to its initial vertical position. As the torsion spring resets lever 83, it pulls rod 82, which rotates common link 84. The spring loaded pin 87 in the common link 84 compresses under the catch 88 of the horizontal link 86 until it clears and then resets to engage the inside of the catch 88 of the horizontal link 85 is then ready to be reactivated with the next load.

An alternative embodiment of elevator lock and release mechanism 80 is shown in FIG. 8A. As shown therein, cable 81 may be a wire rope, rod, bar and the like which is operably connected to horizontal link 85. Alternate pin arrangement 87 shown in FIG. 8A may then work by gravity or with spring (not shown) assist.

A reverse flow mechanism 56 is also provided. Specifically, a reverse slope beam 58 is provided which may be attached to lower stop 52 through a beam 54 or other suitable cross member, or even the ground. The reverse flow mechanism 56 is needed because when the elevator deck assembly 45 is in the upper position, it must be sloped to properly receive the load from the input conveyor 22. However, the elevator flow rails 46 must reverse slope to transfer the load to the output conveyor 24. As previously indicated, this is achieved by pinning 41 elevator flow rails 46 at one end (here, the forward end) and allowing them to rest on frame members 47 at their free end. When the elevator assembly 45 descends to the lower level, the rear, free end of the elevator flow rails 46 contact the reverse slope beam 58 while the rest of the elevator deck assembly keeps lowering until in contact with lower stops 52. When in this position, elevator flow rails 46 reverse slope to coincide with the output conveyor 24.

In the operation of the present invention, a load is placed on the front of the system onto input flow rails 22. The load rolls downward toward the rear of the system. If elevator deck assembly 45 is in the raised position, the load rolls onto elevator flow rails 46 and the elevator deck assembly 45 and the load begin their descent. At this point, since elevator deck assembly 45 has disengaged lever 76, the load stop assembly 70 assumes a stop position with stop plate 73 ready to engage and stop a subsequent load while the elevator deck assembly 45 transfers a load. As previously described, the spacing of a subsequent load may be accomplished with a brake or retarder mechanism.

When elevator deck assembly 45 and the load reach the lowered position reverse slope beam 58 of reverse flow mechanism 56 engages the free end of the elevator flow rails 46, causing the slope of the elevator flow rails 46 to reverse and generally align with output flow rails 24. When elevator deck 45 reaches lower stops 52, elevator lock and release assembly 80 engages hook 49 and lock elevator deck assembly 45 in the lowered position. The load then rolls onto output flow rails 24. As it rolls along output flow rails 24, the load contacts lever 83 and, as described above, releases elevator deck assembly 45 which then ascends. At its uppermost position, elevator deck assembly 45 engages lever 76 which, as described above, ,lowers load stop assembly 70, thereby permitting the subsequent load to roll onto elevator deck assembly 45 for transfer. In this manner, the smooth and efficient transfer of loads using an automatic elevator is accomplished.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention.

Various features of the present inventions are set forth in the following claims.

What is claimed is:

1. A multi-level load storage and transfer system, comprising:
    an input conveyor inclined toward the rear of the system;
    an output conveyor inclined toward the front of the system and located below the input conveyor;
    a gravitationally powered elevator assembly including an elevator deck and a surface upon which loads may roll;
    a mechanical load stop provided along said input conveyor;
    an elevator lock and release mechanism in cooperation with said elevator assembly and said output conveyor; and,
    a reverse flow mechanism including a reverse flow beam in cooperation with said elevator assembly.

2. The invention of claim 1 including at least one gas spring in cooperation with said elevator assembly.

3. The invention of claim 2 wherein said input conveyor includes a roller brake.

4. A multi-level load storage and transfer system, comprising:
    input conveyor means for delivering a load to the rear of the system;
    an output conveyor means for returning a load to the front of the system;
    a gravitationally powered elevator means for transferring a load from the input conveyor means to the output conveyor means;
    an elevator lock and release means for retaining the elevator means in a lowered position until the load to be transferred clears the elevator means and rolls along the output conveyor means;
    a reverse flow means cooperating with said elevator means for accomplishing smooth load transfer; and,
    a load stop means for mechanically stopping a load on the input conveyor means when the elevator means is not ready to accept a load.

5. The invention of claim 4 including a rolling brake means to properly space loads along the input conveyor means.

6. The invention of claim 4 wherein at least one gas spring cooperates with said elevator means.

* * * * *